United States Patent [19]

Dowe

[11] Patent Number: 5,724,625
[45] Date of Patent: Mar. 3, 1998

[54] BELT-DRIVEN SHUTTERS

[75] Inventor: David Reynolds Dowe, Holley, N.Y.

[73] Assignee: Eastman Kodak Company, Rochester, N.Y.

[21] Appl. No.: 660,315

[22] Filed: Jun. 7, 1996

[51] Int. Cl.$^6$ .................................................. G03B 9/20
[52] U.S. Cl. .................................................. 396/497
[58] Field of Search ........................... 354/271.1, 274, 354/261, 264, 265; 355/71; 474/133, 134; 396/452, 493, 500, 495, 497, 510

[56] References Cited

U.S. PATENT DOCUMENTS

| 778,334 | 12/1904 | Ricketts | 354/262 |
|---|---|---|---|
| 2,917,982 | 12/1959 | Martin | 354/264 |
| 2,969,142 | 1/1961 | Mack | 401/59 |
| 3,433,142 | 3/1969 | King | 348/362 |
| 3,592,116 | 7/1971 | Ritze | 354/451 |
| 3,665,069 | 5/1972 | Richmond | 264/219 |
| 3,813,197 | 5/1974 | Ray et al. | 425/111 |
| 3,980,407 | 9/1976 | Hill | 355/71 |
| 4,199,247 | 4/1980 | Schwarz | 354/274 |
| 4,204,758 | 5/1980 | Haynes | 354/152 |
| 4,444,489 | 4/1984 | Bartel et al. | 355/35 |
| 4,470,687 | 9/1984 | Saito et al. | 354/435 |
| 4,531,820 | 7/1985 | Petersen | 354/234.1 |
| 4,558,937 | 12/1985 | Petersen et al. | 354/234.1 |
| 5,523,815 | 6/1996 | Tamura | 354/233 |
| 5,534,961 | 7/1996 | Dowe et al. | 354/264 |
| 5,576,792 | 11/1996 | O'Brien et al. | 396/510 |

FOREIGN PATENT DOCUMENTS

| 35 100 | 5/1885 | Germany . | |
| 180465 | 6/1994 | Japan | G03B 7/00 |

OTHER PUBLICATIONS

Design News, "Plastic Mold Produces One-Piece Auto Air Vents", Dec. 6, 1993, p. 16.

DataBase WPI, Section PQ, Week 8931, Derwent Publications Ltd., London, GB; Class P82, AN 89-226164 & SU-A-1 437 826 (Belorussian Poly), 15 Nov. 1988, abstract.

DataBase WPI, Section PQ, Week 8704, Derwent Publications Ltd., London, GB, Class P82, AN 87-028529, & SW-A-1 236 414 (Belorussian Poly), 7 Jun. 1986, abstract.

Primary Examiner—Safet Metjahic
Assistant Examiner—Christopher E. Mahoney
Attorney, Agent, or Firm—Charles E. Snee, III

[57] ABSTRACT

A belt-driven shutter mechanism includes a shutter frame (20, 22) with an aperture (21), a plurality of hubs (30) rotatably positioned around the aperture, a corresponding plurality of shutter blades (14), one blade being supported by each hub, and a belt (32-42) attached to each of the hubs so that rotation of one hub rotates one of the shutter blades and applies tension to the belt to rotate a remainder of the plurality of hubs and shutter blades. The belt may include a corresponding plurality of spring sections (38) to relieve tension in the belt. The belt may include thin sections (34, 42) to ease wrapping onto the hubs and thickened sections (36-40) to improve moldability. The hubs may include attachment features (44-52) to ease wrapping of the belt onto the hubs. Registration features (54, 56) may be included to maintain registration between the hubs and the frame. One of the hubs may include a feature (58) to mate with an associated shutter actuation magnet.

11 Claims, 2 Drawing Sheets

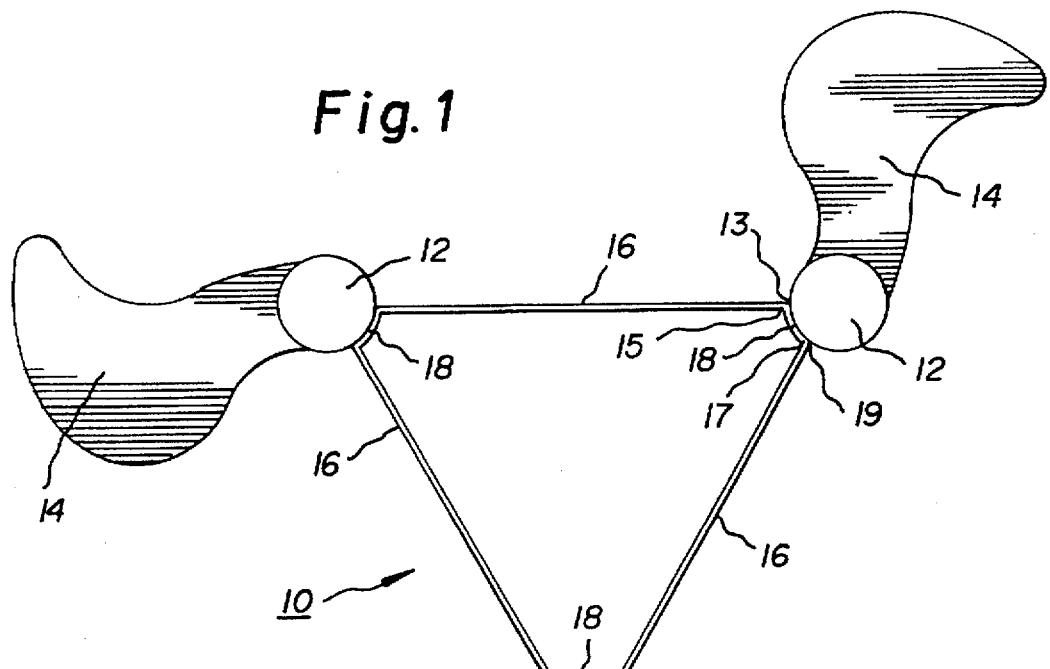
Fig. 1
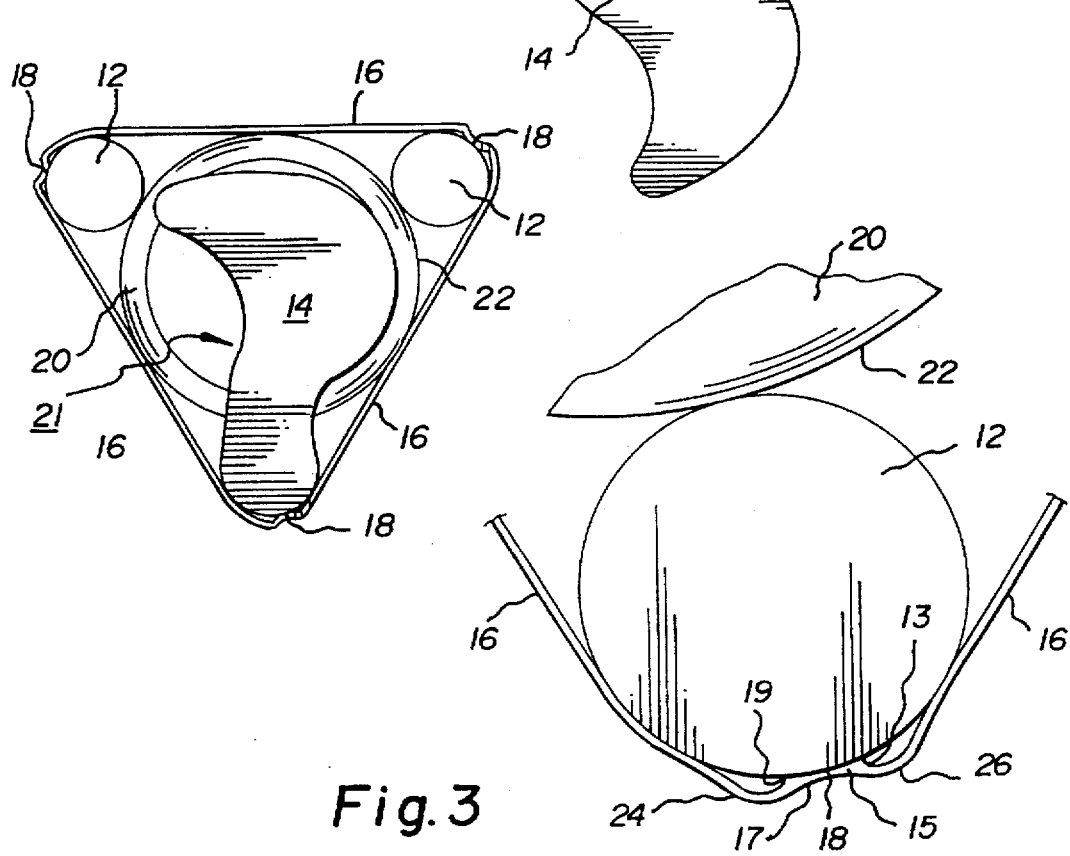
Fig. 2
Fig. 3

BELT-DRIVEN SHUTTERS

TECHNICAL FIELD

The invention relates to shutters suitable for use in optical systems such as found in photographic cameras. More particularly, the invention concerns improvements to belt-driven shutter mechanisms.

BACKGROUND OF THE INVENTION

Belt-driven shutter mechanism are disclosed in copending, commonly assigned U.S. patent application Ser. Nos. 08/238,114 filed May 4, 1994 (the former application) and 08/444,457 filed May 19, 1995 (the latter application). These applications describe the construction, assembly and operation of a shutter mechanism including a plurality of shutter blades, each blade extended radially from one of a corresponding plurality of hubs, and a drive belt interconnecting the hubs. In the former application, the hubs are positioned for rolling contact with fixed abutments, such as curved wall segments, positioned around an aperture opening. In the latter application, the hubs are pivotably mounted around an aperture opening. Compared to many earlier shutter mechanisms, such belt-driven shutter mechanisms can provide faster response times to input signals, faster shutter speeds, lower parts count, and more precise control over shutter and aperture characteristics.

As described in the former application, the drive belt is connected to a plurality of equally spaced hubs each of which supports one of the shutter blades. The assembly of hubs, blades and drive belt is molded in one piece. In an assembled shutter mechanism, the drive belt wraps around a portion of each hub and a section of the drive belt extends in an essentially straight line between adjacent hubs. When any portion of the belt is translated by rotating one of the hubs, the remainder of the belt follows around a central point. As the belt is translated, the hubs are induced to roll on adjacent fixed abutments having surfaces positioned about this central point. Depending on the direction of translation of the belt, the shutter blades rotate synchronously either toward the central point to close the shutter or away from the central point to open the shutter.

Although shutters of the types disclosed in the copending applications have provided various advantages, some problems have been identified. For example, molding of an assembly of hubs, blades and drive belt requires very thin parts to be fabricated. While recently developed molding techniques are said to allow structural members to be molded which have a thickness in the vicinity of 0.003 inch (0.0762 mm), data on shrink rates of parts molded to this thickness are not available. This can cause lost time to characterize the mold process or for a trial and error method to get a mold to work properly. It would be desirable to configure components of a belt-driven shutter mechanism to allow easier molding, while not affecting or minimally affecting the performance of the shutter; and to minimize the effects of shrinkage at very thin walls.

When the molded assembly of hubs, blades and drive belt is mounted to a frame of a shutter mechanism, the belt length between hubs is important. If the belt is too short between hubs, mounting the molded assembly to the frame may be difficult. Moreover, since the belt will be stretched too tight, the shutter mechanism may not function properly. Too much force may be required to actuate the mechanism. In some cases, the belt may stretch so far that it separates from one or more hubs. If the belt is too long between hubs, particularly in the mechanism of the former application, the engagement force between the hubs and the adjacent fixed abutments in the direction of the central point may not be sufficient to hold the hubs in place. The hubs may become mis-registered relative to one another, or in extreme cases may not roll on their respective surfaces about the central point.

As described in the former application, the assembly of hubs, blades and drive belt is molded with the blades extended radially outward, to avoid formation of knife edges in the structure of the mold. Knife edges are places in the mold structure where a surface of one section of the molded part comes in close proximity to a surface of another section of the molded part. For the mold to keep these two surfaces separate during molding, the mold must incorporate a very thin wall or "knife edge" of mold material. Such knife edges typically are very fragile and will not wear very long. In the former application, the joint where the integrally molded belt is fixed each hub includes radiused surfaces on each side of the belt; so that, knife edges will not be required in the mold. The thickness of the belt is about 0.003 inch (0.0762 mm) where the belt joins each hub as molded. However, when the assembly of hubs, blades and belt is turned inside out to orient the blades radially inwardly prior to mounting on the shutter frame, a short length of the belt tends to extend radially out from the hub rather than wrapping smoothly to the hub. This causes the belt to form bulges where it joins each hub. The effect of the bulges is to increase tension in the belt, thereby increasing the loading of the hubs onto the adjacent fixed abutments. On the other hand, if the belt is forced to wrap smoothly onto the hub, fatigue soon occurs where the belt joins each hub.

SUMMARY OF THE INVENTION

A primary objective of the invention is to provide a belt-driven shutter mechanism which can be made using less costly, uncomplicated molds.

A further objective is to provide such a mechanism which has operating characteristics much less dependent on molding parameters.

A further objective is to provide such a mechanism which can be more easily assembled to mating parts in a quicker, less costly manner.

Still another objective is to provide such a mechanism in which sensitivity to the as-molded length of the belt is reduced or eliminated.

Yet another objective is to provide such a mechanism in which the integrity of the joint between the belt and each hub is improved.

A still further objective is to provide such a mechanism in which the hubs and fixed abutments are positively engaged to avoid mis-registration.

Yet a further objective is to provide such a mechanism in which a shutter actuation magnet is incorporated into one of the hubs.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A belt-driven shutter mechanism in accordance with the invention may include a shutter frame with an aperture, a plurality of hubs rotatably positioned around the aperture, a corresponding plurality of shutter blades, one blade being supported by each hub, and a belt attached to each of the hubs so that rotation of one hub rotates one of the shutter blades and applies tension to the belt to rotate a remainder of the plurality of hubs and shutter blades. One embodiment is characterized by a corresponding plurality of spring sections formed in the belt, one spring section between each hub, to relieve tension in the belt. Each spring section may have a serpentine shape. The belt may be thickened at the spring section for ease of moldability.

Another embodiment of the invention is characterized by each of the hubs including a radially extended recess open through a peripheral surface of the hub, the belt being attached to the hub within the recess. The recess may include radiused surfaces at the periphery of the hub to guide the belt onto the peripheral surface. The belt may be attached within the recess at angles directed toward the radiused surfaces.

Another embodiment of the invention is characterized by a feature on one of the hubs to mate with a geometrically similar feature on a shutter actuation magnet. Still another embodiment is characterized by a corresponding plurality of first registration features, one on each hub; and a corresponding plurality of second registration on the shutter frame, the second registration features being engaged with the first registration features. The first and second registration features may be gear sectors or knurled sectors.

The invention provides various advantages. Spring sections in the belt ease assembly of the shutter mechanism and prevent failure of the belt due to excess tension. Thickened sections of the belt improve moldability by reducing the extent of thin belt sections. Recessed attachment points for the belt ensure that the belt can wrap smoothly onto the hubs with reduced tension. The feature for mating with an actuation magnet simplifies the overall mechanism. The gear or knurl sectors prevent the hubs from losing registration with the shutter frame.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 is a plan view of an assembly of hubs, blades and drive belt, as molded with the blades extended radially outwardly, as disclosed in the former application.

FIG. 2 is a plan view of the assembly of FIG. 1 turned inside out with the blades extended radially inwardly and then mounted to a shutter frame to form a shutter mechanism, only one shutter blade being shown for ease of illustration.

FIG. 3 is an enlarged fragmentary view of one hub of the mechanism of FIG. 2, indicating how the drive belt is joined to the hub.

DESCRIPTION OF THE PREFERRED EMBODIMENTS

Figure 4:
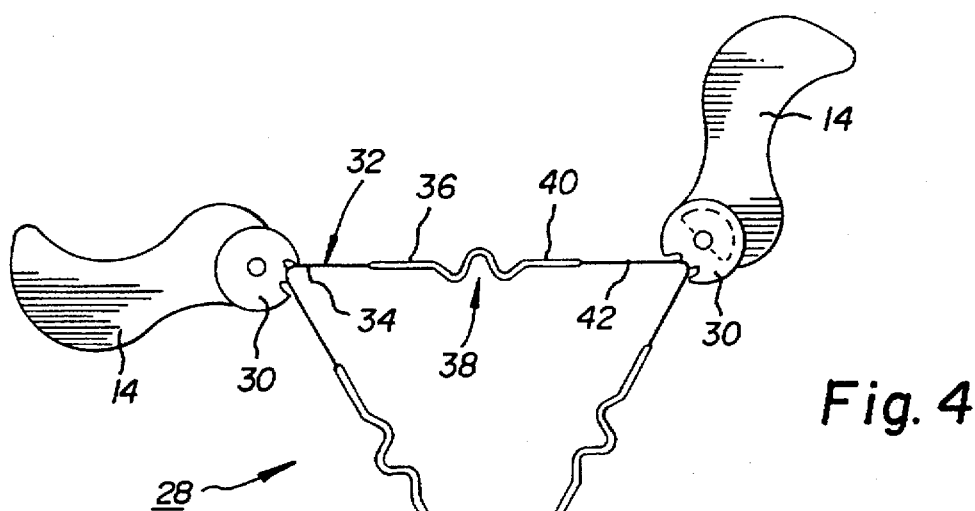
FIG. 4 is a plan view of an improved assembly of hubs, blades and drive belt in accordance with the present invention, as molded with the blades extended radially outwardly.

The following is a detailed description of the preferred embodiments of the invention, reference being made to the drawings in which the same reference numerals identify the same elements of structure in each of the several Figures.

FIG. 1 shows an assembly 10 of a plurality of hubs 12, a corresponding plurality of blades 14, and a drive belt 16, all of the type described in the former application. Assembly 10 is shown as molded with blades 14 extended radially outwardly. As shown in FIG. 1, belt 16 is molded or joined integrally with each hub over a short arc 18. On either side of arc 18, the belt extends essentially radially away from the hub. To avoid knife edges in the mold, radiused surfaces 13, 15, 17, 19 are formed on either side of the belt where it extends from the hubs. For mounting to a shutter frame 20, assembly 10 is turned inside out with blades 14 extended radially inwardly, as shown in FIG. 2. Frame 20 includes near each hub an outer, peripherally extended fixed abutment or wall surface. Hubs 12 are pressed against surface 22 by tension in drive belt 16. Frame 20 includes a central aperture 21 which is opened or closed by movement of blades 14. A suitable shutter actuating motor or mechanism, not illustrated, is operatively connected to rotate one of the hubs to open or close one the shutter mechanism.

A number of drawbacks have been found in the design of FIGS. 1 and 2. FIG. 3 shows an enlarged view of one hub 12 of the assembly of FIG. 2, indicating how belt 16 is joined to the hub at arc 18. As shown in FIG. 3, two sections of belt 16 extend from hub 12, one on each side of arc 18. As previously described, assembly 10 was molded with each section of belt 16 extended radially from each hub along an essentially straight line from hub to hub. See FIG. 1. However, when the assembly of hubs, blades and belt is turned inside out to orient the blades radially inwardly to the configuration of FIG. 2 prior to mounting on shutter frame 20, a short length of the belt tends to extend radially out from the hub rather than wrapping smoothly to the hub. Because the belt tends to remain straight near the points where the belt joins the hubs, humps 24, 26 tend to form at these points, thus increasing the tension in the belt when assembly 10 is mounted to frame 20.

For proper assembly of the shutter mechanism of FIG. 2, belt 16 should have a precise length between hubs 12; so that, enough tension is developed in the belt to hold the hubs in contact with surface 22 on frame 20. If the belt is too long, the hubs will loosely engage surface 22 and the desired rolling motion of the hubs may be limited or not occur. If the belt is too short, the hubs will too tightly engage surface 22 and excessive force may be needed to actuate the shutter mechanism, or the belt may break away from one or more hubs. Breakage of the belt is most likely to occur at humps 24, 26.

Figure 5:
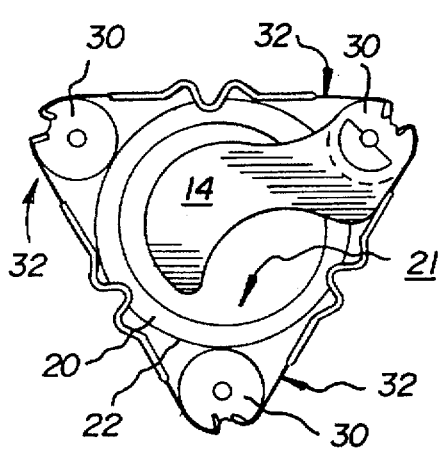
FIG. 5 is a plan view of the assembly of FIG. 4 turned inside out with the blades extended radially inwardly and then mounted to a shutter frame to form a shutter mechanism, only one shutter blade being shown for ease of illustration.

FIG. 4 shows one embodiment of an assembly 28 in accordance with the present invention, including a plurality of hubs 30, a corresponding plurality of blades 14, and a drive belt 32. Assembly 28 may be molded from a suitable plastic, such as acetal, sold by Celanese Corporation, or from other similar materials familiar to those skilled in the plastic molding technologies. As in the assembly of FIG. 1, drive belt 32 comprises a corresponding plurality of sections of equal length, each section being joined at its ends to a pair of hubs 30. To ensure that belt 32 will provide proper tension to engage the hubs with shutter frame 20 when mounted as shown in FIG. 5, each section of the belt preferably includes subsections 34, 36, 38, 40 and 42. Subsections 34 and 42 are at the ends of each section of the belt and are quite thin and flexible, for example having thicknesses of about 0.003 inch (0.0762 mm) to ensure that the ends of each section of belt 32 will wrap smoothly around adjacent hubs 30 when assembly 28 is turned inside out to the configuration of FIG. 5. Between subsections 34 an 42, the belt serves only to transmit forces between the hubs and for that purpose need not be so thin and flexible. Accordingly, central sub sections 36, 38 and 40, which extend continuously between subsections 34 and 42, may be made thicker to facilitate molding of the belt. For example, the central subsections may be about 0.012 inch (0.305 mm) thick. Although thickening subsections 36, 38, 40 facilitates molding, inertia is added to the mechanism and the response time of the mechanism becomes slower. A balance of response of the mechanism and moldability can be achieved.

To provide some resilience in belt 32, subsection 38 preferably has a serpentine shape which can extend and contract like a spring. The spring constant of subsection 38 is chosen to be less than that of subsections 34, 42; so that, subsection 38 will stretch to relieve tension before subsections 34, 42 will fail. Thus, if a section of belt 32, as molded, is too short for mounting in the configuration of FIG. 5, subsection 38 will extend; so that, there will not be too much tension on the belt. Excessive tension could cause a number of problems. Such problems would include separation of the belt from the hub, elongation of the belt due to cold flow of the plastic, or too much force on the hubs causing high actuation forces to be required for the shutter speeds desired. A number of shapes in the belt at subsection 38 will allow for a spring effect, as will be understood by those skilled in the art.

Figure 6:
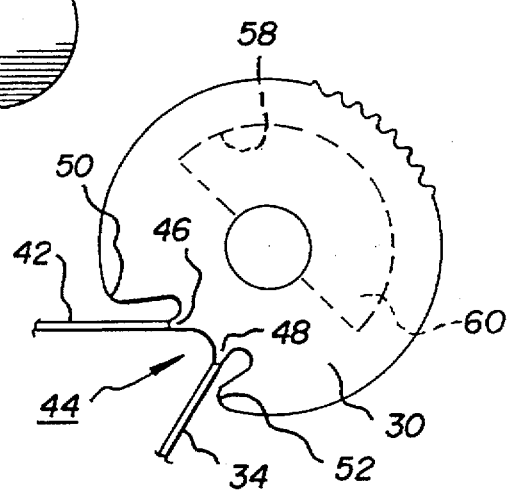
FIG. 6 is an enlarged fragmentary view of one hub of the assembly of FIG. 4, indicating how the drive belt is joined to the hub, as molded.

FIG. 6 shows details of hub 30 which prevent formation of humps 24 and 26 of FIG. 3 and their attendant problems. A radial recess 44 opens outwardly through the peripheral surface of hub 30. Within recess 44, a pair of angled attachment flanges 46, 48 are formed integrally with subsections 42, 34, respectively, of the adjacent sections of drive belt 32. Flanges 46, 48 are set at angles which approximate the angles that will be assumed by belt 32 when assembly 28 is turned inside out and the belt wraps onto the peripheral surfaces of the hubs in the configuration of FIG. 5. At the sides of recess 44, a pair of smoothly radiused surfaces 50, 52 are formed to guide the belt to wrap onto the peripheral surface of the hub when the assembly is turned inside out. Radiused surfaces 50, 52 help to hold the ends of the belt section in line with flanges 46, 48 and also act as strain reliefs for the belt as it wraps around the hub.

Figure 7:
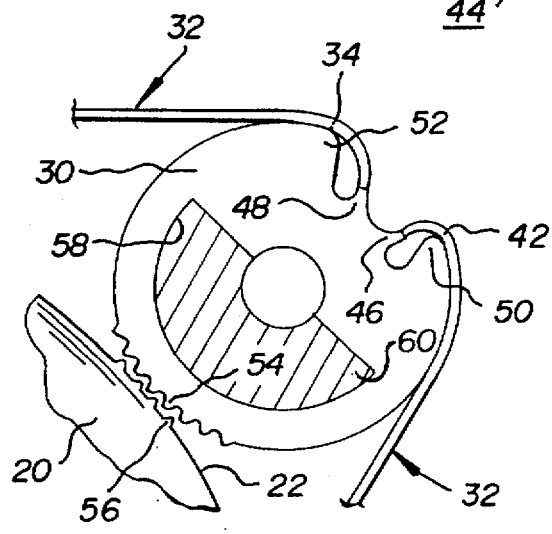
FIG. 7 is an enlarged fragmentary view of one hub of the mechanism of FIG. 5, indicating how the drive belt wraps onto the hub and how the hub engages the shutter frame.

During actuation of a shutter mechanism including assembly 28, hubs 30 roll along surfaces 22 on frame 20. When fast shutter speeds are desired, high forces are applied to the hubs that may cause them to lose their registration relative to frame 20. To help maintain such registration, registration features may be provided on the frame and hubs. For example, a gear sector with small teeth 54 can be molded into each hub as shown best in FIG. 7, to mesh with similar gear sector having teeth 56 molded into surface 22. Alternatively, teeth 54, 56 may be replaced with engaging knurled sections.

One method of actuating a belt-driven shutter mechanism is disclosed in the former patent application. In that method, a shutter actuation magnet is mounted on an axial pin extended from one of the hubs. In accordance with another feature of the present invention, a feature, such as a semi-circular recess 58 may be provided in one end of one of hubs 30, to mate with a geometrically similar feature 60 of a shutter actuation magnet, not illustrated. Because recess 58 is semi-circular, the actuation magnet can be mounted in just one angular orientation within the recess, compared to the axial pin of the former application, which provided no fixed angular orientation. The magnet may be molded into the hub. Use of recess 58 enables the elimination of extra parts otherwise needed to orient the actuation magnet to the hub. An actuation coil, not illustrated, interacts in the known manner with the magnet to rotate the hub and open or close the shutter.

| Parts List | |
|---|---|
| 10 | assembly of hubs, blades & belt |
| 12 | hub |
| 13 | radiused surface |
| 14 | shutter blade |
| 15 | radiused surface |
| 16 | drive belt |
| 17 | radiused surface |
| 18 | arc of joint between 12 & 16 |
| 19 | radiused surface |
| 20 | shutter frame |
| 21 | aperture |
| 22 | wall surface |
| 24 | hump in 16 |
| 26 | hump in 16 |
| 28 | assembly of hubs, blades & belt |
| 30 | hub |
| 32 | drive belt |
| 34 | thin subsection of 32 |
| 36 | thicker subsection of 32 |
| 38 | spring-like subsection of 32 |
| 40 | thicker subsection of 32 |
| 42 | thin subsection of 32 |
| 44 | radial recess in 30 |
| 46 | attachment flange for 32 |
| 48 | attachment flange for 32 |
| 50 | radiused surface |
| 52 | radiused surface |
| 54 | teeth on 30 |
| 56 | teeth on 22 to mesh with 54 |
| 58 | recess for feature of magnet |
| 60 | mating feature of magnet |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, I claim as new and desire to secure Letters Patent for:

1. A belt-driven shutter mechanism including a shutter frame with an aperture, a plurality of hubs rotatably positioned around the aperture, a corresponding plurality of shutter blades, one blade being supported by each hub, and a belt attached to each of the hubs so that rotation of one of the hubs rotates a corresponding one of the shutter blades, which applies tension to the belt to rotate a remainder of the plurality of hubs and shutter blades, is characterized by:

a corresponding plurality of spring sections formed in the belt, one spring section between each adjacent pair of hubs, to relieve tension in the belt, the spring sections having a first spring constant; and between adjacent hubs on each side of each spring section, a thin, flexible subsection of the belt, the subsections having a second spring constant greater than the first spring constant, so that the spring sections will relieve tension applied to the belt.

2. A shutter mechanism according to claim 1, wherein each spring section has a serpentine shape.

3. A shutter mechanism according to claim 1, wherein each spring section is thicker than the subsections on each side thereof, for ease of moldability.

4. A belt-driven shutter mechanism including a shutter frame with an aperture, a plurality of hubs rotatably positioned around the aperture, a corresponding plurality of shutter blades, one blade being supported by each hub, and a belt attached to each of the hubs so that rotation of one of the hubs rotates a corresponding one of the shutter blades, which applies tension to the belt to rotate a remainder of the plurality of hubs and shutter blades, is characterized by:

the belt comprising a corresponding plurality of sections having ends; and each of the hubs including a radially extended recess open through a peripheral surface of the respective hub, adjacent ends of adjacent sections of the belt being attached to a respective one of the hubs at attachment points located within the recess of the respective one of the hubs.

5. A shutter mechanism according to claim 4, wherein the recess of each of the hubs includes radiused surfaces at the periphery of the respective hub to guide the sections of the belt onto the peripheral surface of the respective hub.

6. A shutter mechanism according to claim 5, wherein the adjacent ends of adjacent sections of the belt are attached within the recess of the respective hub at angles directed toward the radiused surfaces of the respective recess.

7. A belt-driven shutter mechanism including a shutter frame with an aperture, a plurality of hubs rotatably positioned around the aperture, a corresponding plurality of shutter blades, one blade being supported by each hub, and a belt attached to each of the hubs so that rotation of one of the hubs rotates a corresponding one of the shutter blades, which applies tension to the belt to rotate a remainder of the plurality of hubs and shutter blades, is characterized by:

the belt comprising a corresponding plurality of sections having ends;

each of the hubs including a radially extended recess open through a peripheral surface of the respective hub, adjacent ends of adjacent sections of the belt being attached to respective ones of the hubs at attachment points located within the recess of the respective one of the hubs;

a corresponding plurality of spring sections formed in the belt, one spring section in each section of the belt between each adjacent pair of hubs, to relieve tension in the belt, the spring sections having a first spring constant; and between adjacent hubs on each side of each spring section, a thin, flexible subsection of the belt attached to a respective adjacent hub at one of the attachment points, the subsections having a second spring constant greater than the first spring constant, so that the spring sections will relieve tension applied to the belt.

8. A shutter mechanism according to claim 7, wherein each spring section has a serpentine shape.

9. A shutter mechanism according to claim 7, wherein each spring section is thicker than the subsections on each side thereof, for ease of moldability.

10. A shutter mechanism according to claim 7, wherein the recess of each of the hubs includes radiused surfaces at the periphery of the respective hub to guide the sections of the belt onto the peripheral surface of the respective hub.

11. A shutter mechanism according to claim 10, wherein adjacent ends of adjacent sections of the belt are attached within the recess of the respective hub at angles directed toward the radiused surfaces of the respective recess.

* * * * *